Sept. 25, 1951  C. F. HOLM  2,569,312
FISHHOOK SUSPENSION DEVICE
Filed April 16, 1948
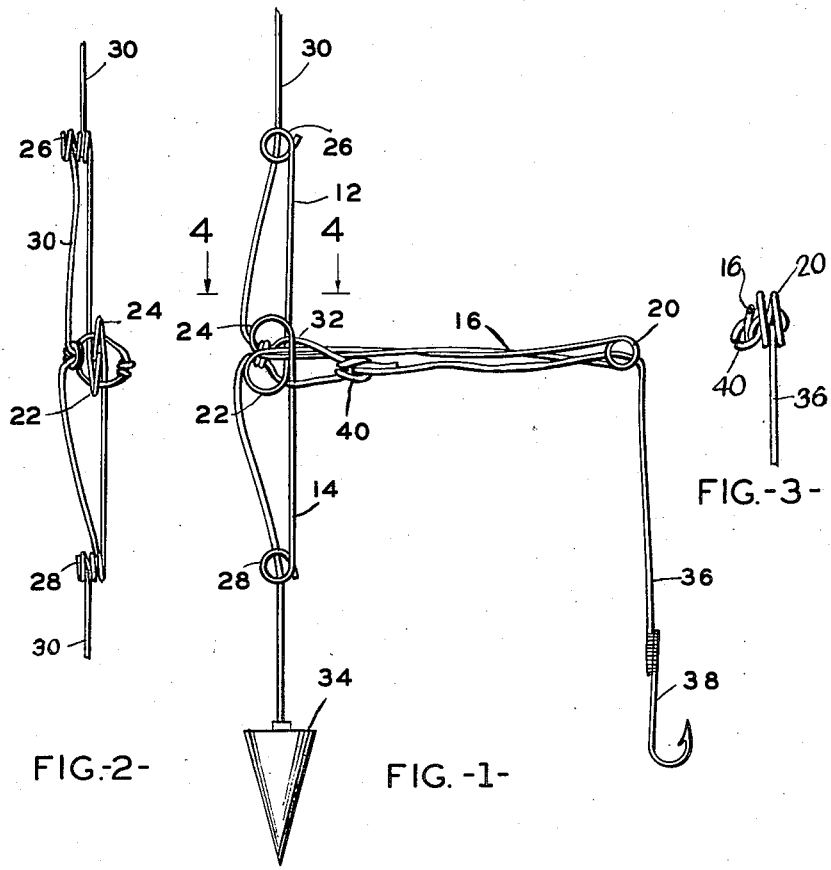
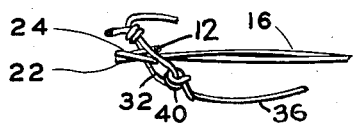
FIG.-4-
INVENTOR.
CHARLES F. HOLM
BY
ATTORNEY Patented Sept. 25, 1951

2,569,312

UNITED STATES PATENT OFFICE 2,569,312

FISHHOOK SUSPENSION DEVICE

Charles F. Holm, Cliffside Park, N. J.

Application April 16, 1948, Serial No. 21,453

4 Claims. (Cl. 43—44.84)

This invention relates to improvements in fishhook suspension devices.

One of the objects of the present invention resides in the provision of a device for suspending a fishhook at a predetermined distance from a fishing line, whereby to avoid tangling of the hook and line, which device can readily be attached to and detached from the line.

Another object is the provision of a device of the character indicated wherein the line and the leader carrying the fishhook can be attached to and detached from the device without the necessity of cutting either the line or leader.

Another object resides in the provision of a device which will effectively suspend the fishhook resiliently from the line in the manner aforesaid.

A further object is the provision of a device of the character indicated having provision for receiving a loop formed on the line or on the leader and securely anchoring the same to the device whereby to avoid accidental detachment of the hook from the device when in use.

A further object resides in the provision of a device of the character indicated, wherein the leader is so attached to a suspension arm of the device that it will readily be released from the arm when a fish is caught, thereby providing a momentary slack in the leader.

Other and further objects and advantages of the present invention will be obvious from the following description and the accompanying drawing, in which drawing:

Fig. 1 is an elevational view of the device showing a fishing line, hook and sinker attached thereto;

Fig. 2 is a left hand view thereof;

Fig. 3 is an enlarged fragmentary right hand end view thereof; and

Fig. 4 is a fragmentary view on line 4—4 of Fig. 1, illustrating the loop in the line and the retaining means therefor.

Referring to the drawing in detail, a suspension device, as shown in Fig. 1, comprises a strand of fine wire formed with three arms 12, 14 and 16. The arm 12, for convenience of description, will be referred to as the upper vertical arm, the arm 14 as the lower vertical arm, and the arm 16 as the hook suspension arm.

The strand of wire is looped intermediate its ends to form a coil 20 of two or more contiguous convolutions at the free end of the hook suspension arm 16. The lays of the wire strand are then twisted about each other to impart the desired strength to the arm 16, and are then formed into eyes or loops 22 and 24 which are interlocked, whereby to prevent separation of the lays of wire forming the arm 16. These eyes or loops are disposed laterally relatively to each other, as will be seen from Fig. 1.

From the loop 22 the wire is bent upwardly to form the upper vertical arm 12, the upper end of which is provided with a coil 26 having a plurality of convolutions; and from the loop 24 the wire is bent downwardly to form the lower vertical arm 14, the lower end of which is provided with a coil 28 similar to the coil 26 and extending in the same general direction.

The suspension device is adapted to be attached to a fishing line 30, which line has a knotted loop 32 formed therein, and is provided with a sinker 34 at its lower end.

In attaching the device to the line it is merely necessary to first slip the line between adjacent convolutions of the coils 26 and 28 with the loop 32 adjacent the eyes 22 and 24 of the device. The loop 32 is then placed over the interlocked, laterally disposed loops or eyes 22 and 24. A leader 36 of a hook 38, having a loop 40 formed therein, is then removably connected to the loop 32 of the line by looping the same therethrough in the usual manner, after which the leader is pulled taut and slipped upwardly between the convolutions of the coil 20 at the free end of the arm 16, permitting the hook to be suspended therefrom, as shown in Fig. 1.

It will be seen from the foregoing, and from Fig. 1, that the weight of the sinker 34 will hold the arms 12 and 14 in a substantially vertical position with the arm 16 extending therefrom in a horizontal direction substantially at right angles to the arms 12 and 14, whereby the leader 36 and hook 38 will be suspended at a distance from the line 30, predetermined by the length of the arm 16, so that the possibility of tangling or fouling of the hook or leader and line is eliminated.

It will also be seen that by employing a fine wire for the device and twisting the strands thereof about each other to form the horizontal hook suspension arm 16 a certain degree of rigidity is provided for the arm, yet retaining sufficient resiliency, for the resilient suspension of the hook.

It will also be seen that by providing the eyes 22 and 24, at the junction of the arms 12 and 14, and applying the loop 32 of the line over the said eyes the line is prevented from yielding or becoming detached from the device under the weight of a fish. It is to be understood that the loop 40 of the leader 36 may be hooked over the eyes 22 and 24, if desired, instead of, or in addition to, the loop 32 of the line.

As will be seen from Fig. 2, the line 30 after being slipped between adjacent convolutions of the coils 26 and 28 may be wound about one of the adjacent convolutions whereby securely to lock the line in the coils.

It will also be seen that by inserting the leader upwardly between the convolutions of the coil 20 at the end of the suspension arm 16, the leader will readily be released when the hook is engaged by a fish, whereby a momentary predetermined slack is automatically provided in the leader.

While I have illustrated and described one embodiment of my invention, it is to be understood that I do not wish to be limited to that precise embodiment, as obviously various modifications and changes may be made therein without departing from the spirit and scope of my invention.

What I claim is:

1. A fishhook suspension device comprising a strand of wire formed into a coil intermediate its ends and twisted about itself to form a hook suspension arm with said coil at one end thereof, loops formed in each lay of the wire at the other end of said arm opposite the said coil and interlocked with each other, a pair of arms extending from said loops in opposite directions substantially at right angles to said suspension arm, and an attaching coil formed adjacent the extremity of each of the arms of said pair.

2. The combination with a fishing line, a fishhook and leader therefor, of a suspension device comprising a strand of wire formed into three arms in T-shaped formation, one of said arms comprising a double lay of the wire and having a coil formed at one of its ends, each lay of wire forming said one arm being formed into an eye at the other end of said one arm, the lays then extending in opposite directions substantially at right angles to said one arm to form the other two arms, said last named arms having line attaching means formed at their extremities, a loop formed in said line and engaged by said eyes, and a loop formed in said leader connected to the loop in said line, said leader being engaged by said coil whereby to suspend the hook from said first mentioned arm.

3. The combination with a fishing line, a fishhook and leader therefor, of a suspension device comprising a strand of wire formed into three arms in T-shaped formation, one of said arms comprising a double lay of the wire twisted about itself and having a coil formed at one of its ends, each lay of the wire forming said arm being formed into an eye at its other end, the lays then each extending in opposite directions substantially at right angles to said arm to form the other two arms, said last named arms having a plurality of line engaging convolutions formed therein adjacent their extremities, a loop formed in said line and looped over the said eyes, and a loop formed in said leader removably connected to the loop in said line, said leader being detachably engaged by said coil, whereby to suspend the hook from said first mentioned arm when the line is engaged by said convolutions.

4. The combination with a fishing line, a fishhook and leader therefor, of a suspension device comprising a strand of wire formed into three arms in T-shaped formation with coils formed at the free ends of each arm, loops formed in the strand at the junction of the said arms, a loop formed in said line and engaged by the loops formed in the strand, and a loop formed in said leader and connected to the loop in said line, the line being engaged between the convolutions of the coils at the free ends of each of two of said arms, and the leader being detachably engaged between the convolutions of the coil at the free end of the other arm, whereby when the hook is engaged by a fish the leader will be released from the last mentioned coil to permit a momentary slack in the leader.

CHARLES F. HOLM.

REFERENCES CITED

The following references are of record in the file of this patent:

UNITED STATES PATENTS

| Number | Name | Date |
|--------|------|------|
| 790,336 | Yoerger | May 23, 1905 |
| 1,720,287 | Moore | July 9, 1929 |
| 2,157,477 | Bulow | May 9, 1939 |
| 2,222,277 | Baker | Nov. 19, 1940 |